(12) United States Patent
Anderberg

(10) Patent No.: US 7,125,019 B2
(45) Date of Patent: Oct. 24, 2006

(54) SINGLE SEAL WITH RESILIENT MEMBER

(75) Inventor: Göran Anderberg, Landskrona (SE)

(73) Assignee: Huhnseal AB, Landskrona (SE)

( * ) Notice: Subject to any disclaimer, the term of this patent is extended or adjusted under 35 U.S.C. 154(b) by 0 days.

(21) Appl. No.: 10/502,924

(22) PCT Filed: Feb. 13, 2003

(86) PCT No.: PCT/SE03/00235

§ 371 (c)(1),
(2), (4) Date: Jul. 28, 2004

(87) PCT Pub. No.: WO03/069197

PCT Pub. Date: Aug. 21, 2003

(65) Prior Publication Data

US 2005/0073108 A1 Apr. 7, 2005

(30) Foreign Application Priority Data

Feb. 14, 2002 (SE) .................................... 0200420

(51) Int. Cl.
*F16J 15/34* (2006.01)
(52) U.S. Cl. .................... 277/390; 277/391; 277/393; 277/379; 277/372; 277/911
(58) Field of Classification Search ............... 277/390, 277/391, 392, 372, 379, 393, 385, 911, 912
See application file for complete search history.

(56) References Cited

U.S. PATENT DOCUMENTS

| | | | |
|---|---|---|---|
| 2,140,304 A | | 12/1938 | Wishart |
| 2,158,832 A | * | 5/1939 | Podbielniak ................. 277/379 |
| 2,185,876 A | * | 1/1940 | Wiessner .................... 277/396 |
| 2,220,814 A | * | 11/1940 | Erbach ........................ 277/385 |
| 2,470,419 A | * | 5/1949 | Voytech ...................... 277/369 |
| 2,525,366 A | | 10/1950 | Meyer |

(Continued)

FOREIGN PATENT DOCUMENTS

EP 0 982 518 3/2000

(Continued)

OTHER PUBLICATIONS

Patent Abstract of Japan of JP 8042707 dated Feb. 16, 1996.

*Primary Examiner*—Alison K. Pickard
(74) *Attorney, Agent, or Firm*—Ladas & Parry LLP

(57) ABSTRACT

The invention relates to a single seal, and more specifically to a seal for a rotary shaft extending through a wall, e.g. that of a pump housing. The single seal exhibits one single sealing location between a stationary and a rotating sealing ring. The seal is attached by means of a flange (12) on to the wall in order to seal off a chamber inside the wall against the shaft (22) and towards the exterior. According to the invention, the sealing rings (1, 2) are biased against each other by means of an axially movable member (5) extending through the wall in order to increase the contact between the sealing rings (1, 2). The resilient member may be a slitted sleeve (5) or a coil spring.

13 Claims, 3 Drawing Sheets

U.S. PATENT DOCUMENTS

| | | | |
|---|---|---|---|
| 2,682,422 A | | 6/1954 | McBride |
| 3,675,933 A | * | 7/1972 | Nappe ........................ 277/370 |
| 4,406,462 A | * | 9/1983 | Witten ........................ 277/348 |
| 5,199,719 A | | 4/1993 | Heinrich et al. |
| 5,538,259 A | | 7/1996 | Uhrner et al. |
| 5,725,219 A | * | 3/1998 | Gilbert ........................ 277/377 |
| 5,924,698 A | | 7/1999 | Parkin |
| 5,947,479 A | | 9/1999 | Ostrowski |
| 6,695,315 B1 | * | 2/2004 | Anderberg ................. 277/369 |

FOREIGN PATENT DOCUMENTS

| | | |
|---|---|---|
| JP | 8042707 | 2/1996 |
| WO | 00/20782 | 4/2000 |

* cited by examiner

SINGLE SEAL WITH RESILIENT MEMBER

FIELD OF THE INVENTION

The present invention relates to a single seal with a resilient member and more particularly a sealing for a rotating shaft passing through a wall, e.g. a pump housing. The single seal has one single sealing interface between a stationary and a rotating sealing ring. The sealing rings are biased towards each other by means of an axially extending, resilient member extending through the wall. The resilient member is arranged outside the pumped medium.

STATE OF THE ART

In this context it is previously known to use springs to keep sealing cartridges together. One arrangement is shown e.g. in U.S. Pat. No. 2,158,832. A problem with this arrangement is that the springs are arranged inside the pump housing, i.e. in the pumped medium. The spring assembly is bulky, and therefore may not be arranged in limited spaces. When pumping liquid media, especially liquid foodstuffs, there will also be problems in that the pumped medium blocks the spring movement. The spring assembly also has a lot of gaps in which the pumped medium may be collected, resulting in hygienic problems.

From SE 9803436-6 it is known to arrange the springs outside the pumped medium. Here a single seal has an outer sealing ring and an inner sealing ring in sliding and sealing contact with each other. The outer sealing ring is attached to the flange, and the inner sealing ring is attached to an axially movable sleeve. The sleeve in turn is attached to and is rotating with the shaft and is extending through the wall and the flange. The seal also has a spring assembly arranged outside the wall and provides a force to increase the contact between the sealing rings.

A problem with this seal is that it is composed of a relatively large number of parts, such as coil springs and driving pins and special fastening means therefor. It is desirable to be able to provide a seal having the same function but having fewer parts and thus a simpler assembly. Also, a rigid sleeve does not follow the movements of the shaft.

The present invention solves these problems by means of a new design of the single seal. The sealing rings are biased towards each other by means of an axially displaceable, resilient member extending through the wall. The resilient member is arranged outside the pumped medium.

One advantage is that one single member both provides the biasing force keeping the seal package together and biasing the sealing rings towards each other, and in addition transfers the rotation of the shaft to one of the sealing rings. The number of parts of the seal is decreased and the assembly of the seal is simplified. Since the member is resilient, it is also capable of accommodating any movements of the shaft in contrast to a rigid sleeve.

The seal is also substantially free from pockets, in which medium may collect. The whole spring package is arranged on the atmospheric side, so that the problems associated with the pumped medium in contact with the springs are avoided.

SUMMARY OF THE INVENTION

Thus, the present invention provides a single seal for sealing of a rotating shaft extending through a wall. The seal is mounted on the wall by means of a flange in order to seal off a chamber inside the wall against the shaft and towards the exterior. The seal comprises an outer sealing ring and an inner sealing ring, said sealing rings being in sliding and sealing contact with each other. The outer sealing ring is fastened to the flange and the inner sealing ring is fastened to an axially extending member, and in turn fastened to and rotating together with the shaft and is extending through the wall and the flange.

According to the invention, the axially extending member is resilient and provides the force acting in a direction to increase the contact between the sealing rings.

In one embodiment the resilient member is a slitted sleeve.

In another embodiment the resilient member is a coil spring.

The invention is defined in the accompanying claim 1, whereas advantageous embodiments are defined in the dependent claims.

BRIEF DESCRIPTION OF THE DRAWINGS

The invention will be described in detail hereinafter, with reference to the enclosed drawings, of which.

DETAILED DESCRIPTION OF PREFERRED EMBODIMENTS

The present invention relates to a single seal, especially suited for use in a pump for foodstuffs and similar. The hygiene requirements for such pumps are very stringent, entailing that the sealing package must be as smooth as possible, in order for the foodstuff pumped not to collect in pockets and minor spaces. Inside such pumps, often the room for the seal is also limited. Often the sealing function has been provided by box plaits with a cross section of 9×9 mm. The foodstuffs are also generally pumped under low pressure, requiring a high degree of balancing of the seal.

The present invention provides a single seal, well fulfilling the above demands thanks to a novel design.

Figure 1:
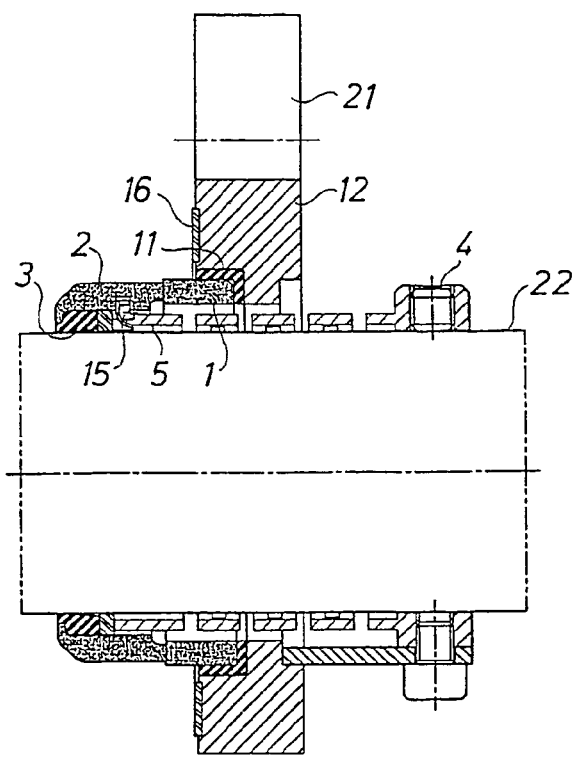
FIG. 1 is a cross sectional view of a single seal according to a first embodiment of the invention along the cross-section in FIG. 3.
Figure 2:
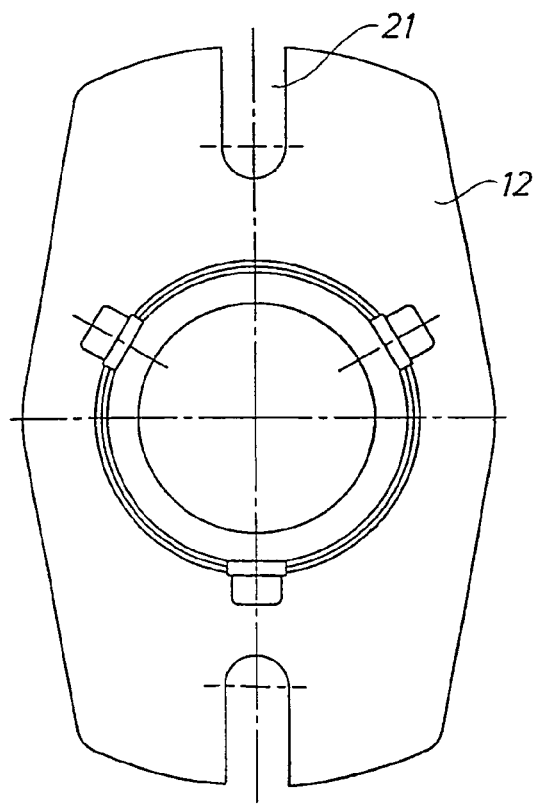
FIG. 2 is an end view of the seal mounted on a flange.
Figure 3:
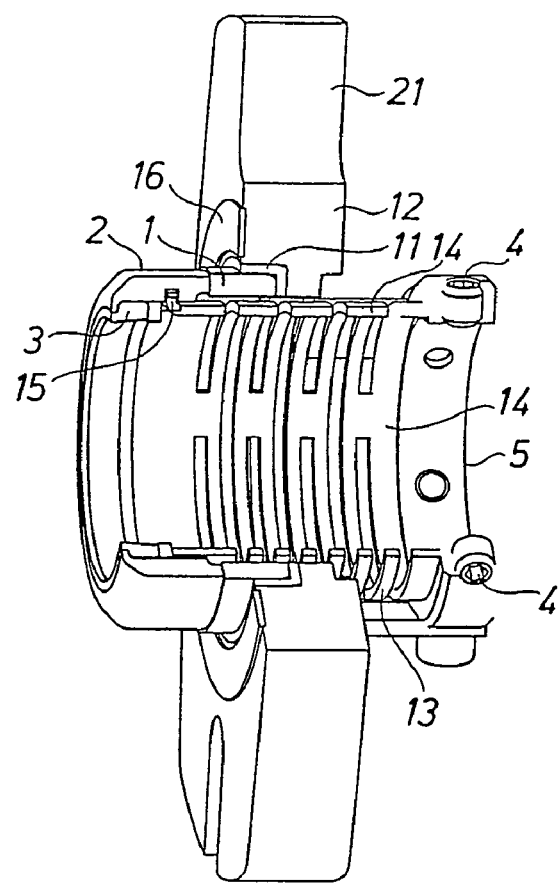
FIG. 3 is a cross-sectional perspective view of the single seal of FIG. 1.

Generally, the sleeve is delivered as a cartridge or package to be fastened to a wall (not shown) around a pump shaft 22, such as shown in FIGS. 1 and 3. The package is fastened by means of screws through a flange 12. In FIG. 1, the pump chamber is located to the left of the flange 12. In the pump chamber is a pump runner (not shown) propelling the pumped medium. In the present description, the terms outer and inner relate to positions with respect to the pump chamber and the outside of the flange. In other words, outer is to the right in the figures and inner is to the left in the figures. In FIG. 2, two notches or recesses 21 are shown, in which screws are placed for fastening the seal to the wall of the pump housing.

As mentioned earlier, the invention relates to a single seal, i.e. there is only one sealing interface between moving parts. The seal has a counter sealing ring or outer sealing ring 1 (inside the pump housing) and an inner sealing ring 2. The outer sealing ring 1 is located in a recess in the flange 12. In an alternative, the sealing ring 1 may be held by a retaining ring. Between the outer retaining ring 19 and the flange there is further a rubber seal in the form of a sealing sleeve 11. Between the flange 12 and the pump house wall (not shown) there is furthermore a flat seal 16.

The inner sealing ring 2 thus rotates with the shaft 22. It is held by a resilient member, here an axial through sleeve 5. The sleeve holds the sealing ring 2, e.g. by means of lugs 15 at the edge of the sleeve, the lugs engaging a recess in the sealing ring 2.

Figure 4:
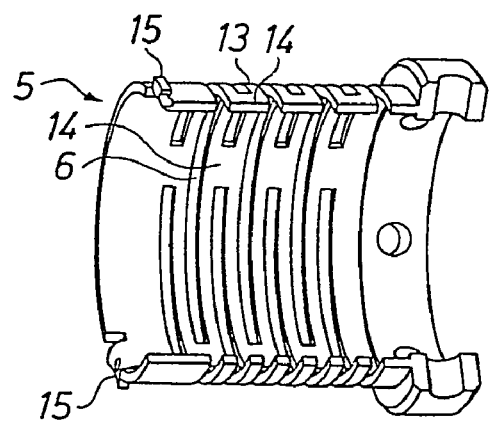
FIG. 4 is a cross-sectional perspective view of a resilient member in the form of a slitted sleeve.

The lugs 15 are most clearly shown in FIG. 4, only showing the sleeve 5. The lugs 15 are formed by tongues slitted and bent from the sleeve material. At the assembly of the sleeve in the sealing ring 2, the lugs are engaged by a pair of tongs and moved resiliently together so that they can pass into the sealing ring 2 and are then released outwards into their respective recesses.

It is this sleeve 5 that rotates the inner sealing ring 2. The sleeve 5 transfers a torque acting in a direction to drive the inner sealing ring 2 together with the shaft 22. The sleeve is driven in turn by a coupling on the outside (the atmospheric side) of the pump housing. In its simplest form, the coupling is one or more radial stop screws 4 that are securely tightened against the shaft 22. The sleeve 5 is extended up to a desired biasing force before the stop screws 4 are tightened.

The sleeve 5 also provides the resilient force keeping the sealing rings 1, 2 against each other. The sleeve has been made resilient by forming a number of slits 6 and circular segments 13. The segments 13 are connected to each other by leaving lands 14 of the sleeve material. The lands 14 are alternately located, such that the sleeve may be extended elastically like a spring. Suitably, there are two lands 14 between each segment 13. In that case, the lands are located opposite each other by 180° in a pair with 90° to the lands in alternate pairs. If a stiffer resilience is desired more lands per pair may be used. It will be appreciated that the lands should be distributed evenly around the circumference and alternately in every second pair.

The number of segments, as well as the axial width of the segments and the lands and the circumferential extension of the lands may be varied in order to obtain the suitable resilient characteristics.

Suitably, the sleeve is manufactured from stainless steel with a suitable coefficient of elasticity, e.g. a spring steel.

Figure 6:
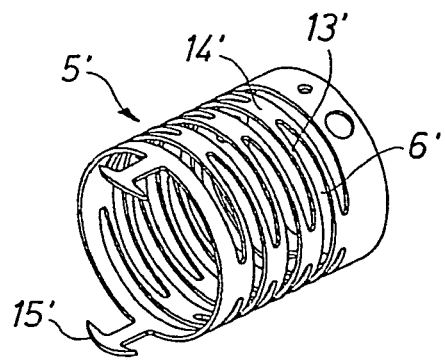
FIG. 6 is a sectional perspective view of a resilient member in the form of another slitted sleeve.
Figure 7:
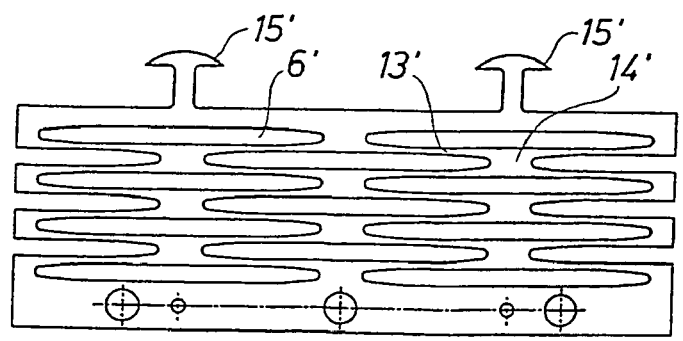
FIG. 7 is a plan view of a piece cut-out from a metal sheet for forming the sleeve of FIG. 6.

Another embodiment of the resilient sleeve 5' is shown in FIGS. 6 and 7. The lugs 15 are replaced by crescent shaped anchoring hooks 15'. In this embodiment, the segments 13' and slits 6' are more oval and have rounded edges towards the lands 14'. Thus, straight corners are avoided which otherwise can cause unnecessary stress in the material. Also, the sleeve 5' has a uniform thickness associated with a preferred manufacturing method as described below.

A preferred manufacturing method comprises laser cutting the shape, i.e. the outer contour of the intended sleeve 5' as well as the slits 6', from a rolled metal sheet, roller bending the cut-out piece into the final circular shape, and welding the axial edges together. The hooks 15' are bent outwards 900 (not shown) to be able to engage grooves in the sealing ring. This manufacturing method is economic and results in superior resilience characteristics.

The sleeve may also be manufactured by drawing from a steel cylinder. Alternatively, the sleeve may be forged from a cast tube or bored bar and the slits milled away.

The choice of material as well as the selected manufacturing method affects the resilient characteristics of the finished sleeve.

Figure 5:
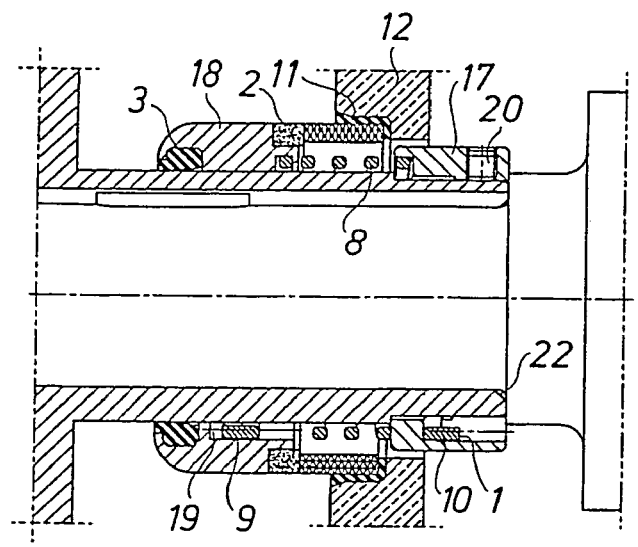
FIG. 5 is a cross-sectional view of a single seal according to a second embodiment of the invention having a resilient member in the form of a coil spring.

As an alternative to a resilient sleeve, a coil spring 8 may be used as is shown in FIG. 5. The inner end of the coil spring 8 is attached to the retainer ring 18 in turn retaining the inner sealing ring 2'. The retaining ring may also be integral with the sealing ring as in FIG. 1. The retaining ring 18 is provided with an internal groove following the pitch of the spring (unbiased or somewhat biased). The spring 8 is threaded in the groove and ends with a straight axially directed part 9 engaging a recess 19 in the retaining ring 18. The outer edge of the coil spring 8 is correspondingly attached to an outer retaining ring 17 by a straight axially directed part 10 engaging a recess 7. One or more stop screws 20 are tightened against the shaft to secure the outer retaining ring 17 and thereby transmitting the rotation of the shaft to the inner sealing ring 2' via the spring 8.

A disadvantage compared to the sleeve is that the coil spring is not independent of the direction of the rotation. The shaft should be driven in that direction tending to retract the coil spring radially and axially. If the shaft is driven in the other direction, the coil spring will rise radially which can cause a break. However, the coil spring provides a cheaper and good functional alternative in some applications. In other respects, the function of this embodiment does not differ from the embodiment with the resilient sleeve.

Because the spring arrangement and the coupling are located outside the pump housing on the atmospheric side, the edge width of the sealing package inside the pump housing can be kept small.

The resilient sleeve 5, 5' (or the spring 8) provides a force pulling the inner sealing ring 2 (or 2') towards the outer sealing ring 1. The force from the sleeve acts to press the sealing rings 1, 2 (or 2') against each other. The force is a complement to the hydraulic pressure inside the pump, which also acts in the same direction. However, before the pump starts, there is no overpressure in the pump housing.

When the pump is operated with for example foodstuffs, low pressures are generally used, e.g. 6 bar. In order to obtain a secure sealing function, a high degree of balancing is thus required of the sealing package. The balancing degree is the quotient between the area acted upon by the hydraulic pressure and the sealing area. In spite of the present single seal having a relatively low edge width, about 9 mm between its inner and outer diameters, the single seal has a balancing degree of about 1.3.

The seal also has few corners and areas where the pumped medium could collect and eventually cause bacteria colonies to develop when the pump is used for pumping foodstuffs.

The inner retaining ring 19 (and, as the case may be, the retaining ring 18) is also complemented by a rubber seal 3. This is preferably a so-called lip seal having a positive radius towards the pumped medium, allowing the pumped medium to aid in pressing the seal 3 against the shaft 22. Thus no pocket is created here either, as opposed to conventional O-ring seals.

The seal rings 1 and 2, 2' themselves are preferably manufactured from a hard material, such as silicon carbide. Furthermore, they preferably have a diamond coating on the sealing surfaces. The diamond coating reduces the friction to a third of that of normal sealing materials, entailing lower heat generation and allowing the seal to handle dry friction.

The coating also has a high wear resistance. Thus, the sealing rings can handle a higher closing force.

The single seal according to the present invention thus fulfils exacting demands on dimensions, hygiene and balancing degree. The invention has been described in detail with reference to a preferred embodiment as illustrated in the drawings. A person skilled in the art will understand that dimensions, selected materials, etc. can be varied without departing from the scope of the invention. The mechanical connections with screws, pins and similar may be varied in many ways. The invention is only limited by the following claims.

The invention claimed is:

1. A single seal assembly for the sealing of a rotary shaft extending through a wall of a housing and, seal off a chamber inside the housing from outside the wall, said seal assembly comprising a flange adapted to be mounted on the wall, an outer sealing ring and an inner sealing ring disposed on the shaft within the chamber inside the housing, said sealing rings being in sliding and sealing contact with each other, the outer sealing ring being fastened to the flange, the inner sealing ring surrounding said shaft and being secured to an axially extending member, said axially extending member being fastened with and rotating with the shaft, and extending through the flange into the chamber, wherein the axially extending member is subjected to pressure in said chamber for producing a pulling force acting in a direction to pull the inner ring against the outer ring to increase contact between the sealing rings while developing a torque to drive the inner sealing ring with said shaft in common rotation, wherein said axially extending member is a slitted sleeve which comprises circular segments connected to each other by lands, said lands being alternately located so that the sleeve is elastically extendable.

2. A single seal assembly according to claim 1, wherein two said lands are provided between each segment, the lands being located opposite each other at 180° in one pair and at 90° to the lands in alternate pairs.

3. A single seal assembly according to claim 1, wherein a number of lands are evenly distributed around the circumference of the sleeve and alternately in every second pair.

4. A single seal assembly according to claim 1, wherein the number of segments is in the range of 1–10.

5. A single seal assembly according to claim 1, wherein the sleeve is connected to the inner sealing ring by means of a lug at the edge of the sleeve, said lug engaging a recess in the inner sealing ring.

6. A single seal assembly according to claim 1, wherein the sleeve is connected to the shaft by means of a stop screw.

7. A single seal assembly according to claim 1 wherein the outer sealing ring is brought against the flange with a first further seal therebetween, and the inner sealing ring is brought against the shaft with a second further seal therebetween.

8. A single seal assembly according to claim 7, wherein the second further seal between inner sealing ring and the shaft is a lip seal.

9. A single seal assembly according to claim 1, wherein the axially extending member is manufactured from a rolled metal sheet.

10. A single seal assembly according to claim 1, wherein the sealing rings are manufactured from silicon carbide with a diamond coating on the contact surfaces.

11. A single seal assembly for the sealing of a rotary shaft extending through a wall of a housing and seal off a chamber inside the housing from outside the wall, said seal assembly comprising a flange adapted to be mounted on the wall, an outer sealing ring and an inner sealing ring disposed on the shaft within the chamber inside the housing, said sealing rings being in sliding and sealing contact with each other, the outer sealing ring being secured to the shaft for rotation therewith the inner sealing ring surrounding said shaft and connected to an axially extending tension coil spring, said axially extending coil spring having an outer end fastened to said outer sealing ring and rotating with the shaft, said coil spring having an inner end secured to said inner ring and producing a pulling force acting in a direction to pull the inner ring against the outer ring to increase contact between the sealing rings while developing a torque to drive the inner sealing ring in rotation with said shaft, wherein the inner sealing ring is provided with an internal groove following the pitch of the spring, said spring being threaded in the groove and ending with a straight axially directed part engaging a recess in the sealing ring, and the outer end of the coil spring is attached to an outer retaining ring secured to the outer sealing ring, said outer retaining ring being provided with an internal groove following the pitch of the spring, the spring being threaded in the groove and ending with a straight axially directed part engaging a recess in the outer retaining ring.

12. A single seal assembly according to claim 11, wherein the outer retaining ring is connected to the shaft by means of a stop screw.

13. A single seal assembly for the sealing of a rotary shaft extending through a wall of a housing and, seal off a chamber inside the housing from outside the wall, said seal assembly comprising a flange adapted to be mounted on the wall, an outer sealing ring and an inner sealing ring disposed on the shaft within the chamber inside the housing, said sealing rings being in sliding and sealing contact with each other, the outer sealing ring being secured to the shaft for rotation therewith, the inner sealing ring surrounding said shaft and connected to an axially extending tension coil spring, said axially extending coil spring having an outer end fastened to said outer sealing ring and rotating with the shaft, said coil spring having an inner end secured to said inner ring and producing a pulling force acting in a direction to pull the inner ring against the outer ring to increase contact between the sealing rings while developing a torque to drive the inner sealing ring in rotation with said shaft, wherein the inner end of the coil spring is attached to the inner sealing ring by means of a retaining ring, which is provided with an internal groove following the pitch of the spring, the spring being threaded in the groove and ending with a straight axially directed part engaging a recess in the retaining ring, and the outer end of the coil spring is attached to an outer retaining ring secured to the outer seal ring, said outer retaining ring being provided with an internal groove following the pitch of the spring, the spring (8) being threaded in the groove and ending with a straight axially directed part engaging a recess in the outer retaining ring.

* * * * *